United States Patent
Ahmadi Kalateh Ahmad et al.

(10) Patent No.: US 10,920,575 B2
(45) Date of Patent: Feb. 16, 2021

(54) METHODS AND SYSTEMS EMPLOYING A ROTATING MAGNET AND FIBER OPTIC SENSORS FOR RANGING

(71) Applicant: Halliburton Energy Services, Inc., Houston, TX (US)

(72) Inventors: Akram Ahmadi Kalateh Ahmad, Houston, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 409 days.

(21) Appl. No.: 15/755,177

(22) PCT Filed: Oct. 29, 2015

(86) PCT No.: PCT/US2015/058128
§ 371 (c)(1),
(2) Date: Feb. 26, 2018

(87) PCT Pub. No.: WO2017/074399
PCT Pub. Date: May 4, 2017

(65) Prior Publication Data
US 2020/0224527 A1    Jul. 16, 2020

(51) Int. Cl.
*E21B 47/0228* (2012.01)
*E21B 47/092* (2012.01)
*G01V 3/26* (2006.01)

(52) U.S. Cl.
CPC ........ *E21B 47/0228* (2020.05); *E21B 47/092* (2020.05); *G01V 3/26* (2013.01)

(58) Field of Classification Search
CPC .......................... E21B 47/022; E21B 47/0228
See application file for complete search history.

(56) References Cited

U.S. PATENT DOCUMENTS

| | | | |
|---|---|---|---|
| 5,218,301 A | 6/1993 | Kuckes | |
| 5,589,775 A | 12/1996 | Kuckes | |

(Continued)

FOREIGN PATENT DOCUMENTS

| | | | |
|---|---|---|---|
| WO | 2014089402 A2 | 6/2014 | |
| WO | 2014120305 A1 | 8/2014 | |

(Continued)

OTHER PUBLICATIONS

CA Application Serial No. 2,997,113, Office Action, dated Sep. 5, 2019, 4 pages.

(Continued)

*Primary Examiner* — Shane Bomar
(74) *Attorney, Agent, or Firm* — Gilliam IP PLLC

(57) ABSTRACT

A system includes a drillstring in a first borehole. The drillstring includes a magnet rotatable about an axis of the drillstring. The system further includes at least one fiber optic sensor deployed in a second borehole for generating electromagnetic (EM) field measurements in response to a magnetic field produced by rotation of the magnet about the axis of the drillstring. The system further includes a processor in electronic communication with the at least one fiber optic sensor to determine a distance or direction of the magnet relative to the at least one fiber optic sensor based on the EM field measurements.

20 Claims, 9 Drawing Sheets

(56) References Cited

U.S. PATENT DOCUMENTS

| | | | |
|---|---|---|---|
| 8,596,382 B2* | 12/2013 | Clark | E21B 47/0228 |
| | | | 175/45 |
| 9,046,343 B2 | 6/2015 | Clark | |
| 2003/0085059 A1 | 5/2003 | Kuckes et al. | |
| 2006/0028321 A1* | 2/2006 | Kennedy | E21B 47/0228 |
| | | | 340/385.1 |
| 2007/0126426 A1 | 6/2007 | Clark et al. | |
| 2009/0200854 A1* | 8/2009 | Vinegar | E21B 43/30 |
| | | | 299/5 |
| 2009/0302851 A1* | 12/2009 | Bittar | G01V 3/28 |
| | | | 324/338 |
| 2010/0044035 A1* | 2/2010 | Bespalov | E21B 47/022 |
| | | | 166/255.1 |
| 2011/0088890 A1* | 4/2011 | Clark | G01B 7/14 |
| | | | 166/66.5 |
| 2011/0308794 A1 | 12/2011 | Bittar et al. | |
| 2013/0341092 A1* | 12/2013 | Hay | E21B 47/0228 |
| | | | 175/24 |
| 2014/0175271 A1* | 6/2014 | Samson | E21B 49/08 |
| | | | 250/264 |
| 2014/0191761 A1 | 7/2014 | San Martin et al. | |
| 2014/0222343 A1 | 8/2014 | Samson et al. | |
| 2014/0374159 A1* | 12/2014 | McElhinney | E21B 43/305 |
| | | | 175/45 |
| 2015/0137817 A1 | 5/2015 | Wilson et al. | |
| 2016/0237807 A1* | 8/2016 | Wilson | E21B 7/06 |
| 2018/0334899 A1* | 11/2018 | Wilson | G01C 21/20 |

FOREIGN PATENT DOCUMENTS

| | | |
|---|---|---|
| WO | 2014183187 A1 | 11/2014 |
| WO | 2015080706 A1 | 6/2015 |
| WO | 2015094180 A1 | 6/2015 |
| WO | 2015178878 A1 | 11/2015 |
| WO | 2016108905 A1 | 7/2016 |

OTHER PUBLICATIONS

European Application Serial No. 15907496.2; Extended European Search Report; dated May 2, 2019, 7 pages.
PCT Application Serial No. PCT/US2015/058128, International Search Report, dated Jul. 28, 2016, 3 pages.
PCT Application Serial No. PCT/US2015/058128, International Written Opinion, dated Jul. 28, 2016, 9 pages.
Canadian Application Serial No. 2,997,113; Examiner's Letter; dated Dec 4, 2018, 4 pages.
Hay, et al., "MGT Operations—Overview", Sperry-Sun Drilling Services & Vector Magnetics, Document # 083091, May 24, 1997, 97 pages.

* cited by examiner

METHODS AND SYSTEMS EMPLOYING A ROTATING MAGNET AND FIBER OPTIC SENSORS FOR RANGING

BACKGROUND

The world depends on hydrocarbons to provide much of its energy requirements. Oil field operators strive to produce and sell hydrocarbons as efficiently as possible. Much of the easily obtainable oil has already been produced, so new techniques are being developed to extract less-accessible hydrocarbons. One such technique is steam-assisted gravity drainage ("SAGD").

In one example implementation, SAGD uses a pair of vertically-spaced, horizontal wells less than about 10 meters apart. The upper well is used to inject steam into the formation. The steam heats the heavy oil, thereby increasing its mobility. The warm oil (and condensed steam) drains into the lower well and flows to the surface. A throttling technique is used to keep the lower well fully immersed in liquid, thereby "trapping" the steam in the formation. If the liquid level falls too low, the steam flows directly from the upper well to the lower well, reducing the heating efficiency and inhibiting production of the heavy oil. Such a direct flow (termed a "short circuit") greatly reduces the pressure gradient that drives fluid into the lower well.

Short circuit vulnerability can be reduced by carefully maintaining the inter-well spacing, i.e., by making the wells as parallel as possible. (Points where the inter-well spacing is smaller than average provide lower resistance to short circuit flows.) In the absence of precision drilling techniques, drillers may employ larger inter-well spacings to reduce the effects of inter-well spacing variations. Precision placement of neighboring wells is also important in other applications, such as collision avoidance, infill drilling, observation well placement, coal bed methane degasification, and wellbore intersections. The ranging operations needed to achieve precision placement of neighboring wells can be costly and time-consuming.

BRIEF DESCRIPTION OF THE DRAWINGS

Accordingly, there are disclosed in the drawings and the following description methods and systems employing a rotating magnet and fiber optic sensors for ranging. In the drawings.

Figure 1:
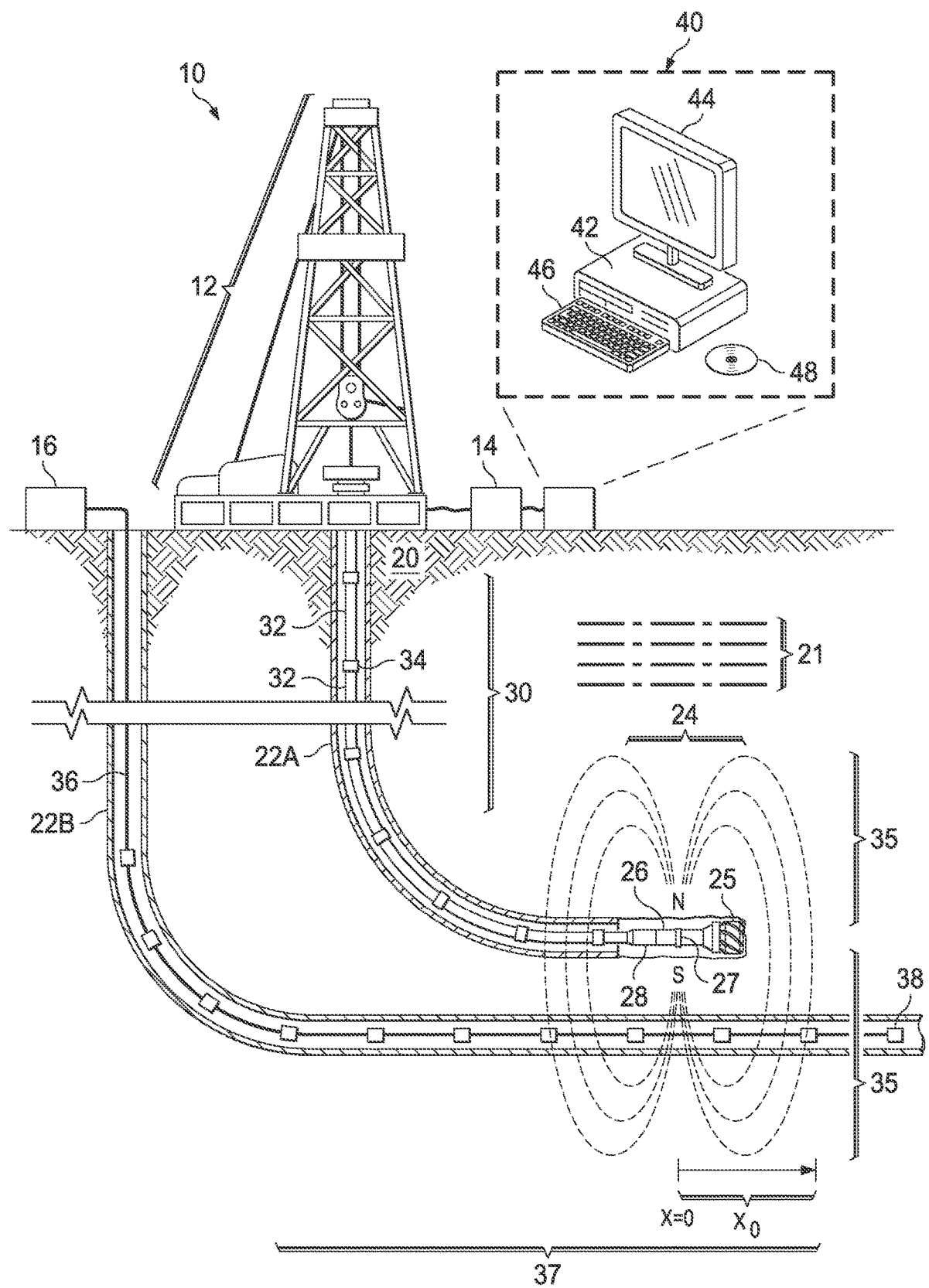
FIG. 1 is a schematic diagram showing an illustrative ranging scenario.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems employing fiber optic sensors for ranging. In at least some embodiments, a method includes producing a time-varying magnetic field by rotating a magnet in a first borehole (e.g., a new well). The method also includes obtaining electromagnetic (EM) field measurements generated in response to the magnetic field using at least one fiber optic sensor deployed in a second borehole (e.g., a target well). The method also includes determining a distance or direction of the magnet relative to one or more of the at least one fiber optic sensor based on the EM field measurements. A related system includes a drillstring in a first borehole. The drillstring includes a magnet rotatable about an axis of the drillstring. The system further includes at least one fiber optic sensor deployed in a second borehole for generating electromagnetic (EM) field measurements in response to a magnetic field produced by rotation of the magnet about the axis of the drillstring. The system further includes a processor in electronic communication with the at least one fiber optic sensor to determine a distance or direction of the magnet relative to the at least one fiber optic sensor based on the EM field measurements. The methods and systems can be used for directional drilling and/or for other operations that rely on tracking position of a downhole object relative to a reference position or target position.

In at least some embodiments, the magnet may be part of a logging-while-drilling (LWD) tool. In such case, the at least one fiber optic sensor may be deployed along a fiber optic cable that serves multiple roles. For example, in one role, the fiber optic cable is used to convey EM field measurements for ranging operations. In another role, the fiber optic cable is used to collect distributed sensing measurements related to pressure, temperature, chemicals, or acoustic activity. Other roles are possible. For example, the fiber optic sensors may collect EM survey data (e.g., during production or reservoir monitoring operations). Using ranging system components in multiple roles (or using logging/sensing system components for ranging) as described herein decreases the overall cost compared to using separate systems. Various component role options, fiber optic sensor options, sensor placement options, and ranging options are disclosed herein.

FIG. 1 shows an illustrative ranging scenario. In FIG. 1, a drilling assembly 12 enables a drillstring 30 to be lowered and raised in a borehole 22A that penetrates formations 21 of the earth 20. The drillstring 30 includes a plurality of drillstring segments 32 joined by collars or adaptors 34. At the lower end of the drill string 30, a bottomhole assembly 24 (BHA) with a drill bit 25 removes material and penetrates the formations 21 using known drilling techniques. The BHA 24 may include, for example, thick-walled tubulars called drill collars, which add weight and rigidity to aid the drilling process. The thick walls of these drill collars make them useful for housing instrumentation and LWD sensors.

In at least some embodiments, the BHA 24 includes a logging tool 26 with at least one magnet 27 and a telemetry/control unit 28. The magnet 27 may be a permanent magnet and/or a bar magnet. With continued reference to FIG. 1, the magnet 27 has a north (N) pole and a south (S) pole. The direction of the magnetic moment (or magnetic dipole moment) of the magnet 27 points from the S pole to the N pole. The magnet 27 produces a magnetic field 35 (see also FIG. 2).

Figure 2:
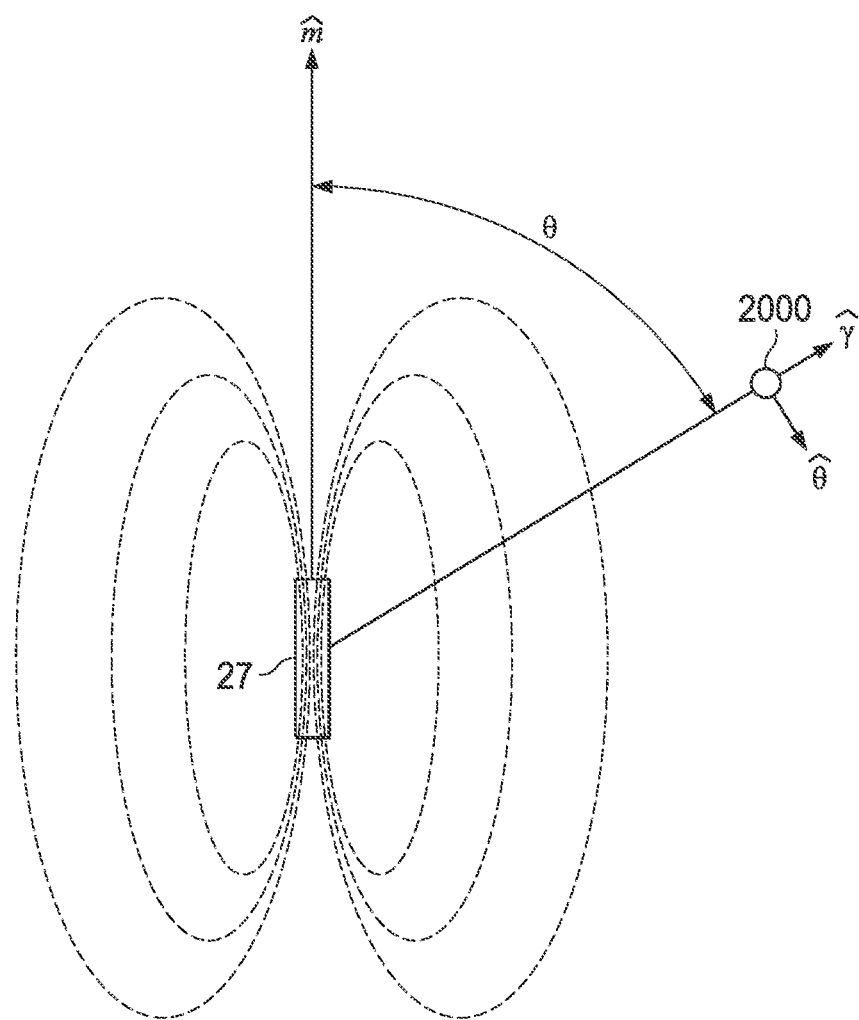
FIG. 2 is a diagram illustrating a magnetic field produced by a magnet.

With reference to FIG. 2, a magnetic moment of the magnet 27 points in the direction $\hat{m}$ and has a strength of m Weber·meters. A magnetic field vector at a given point in space about the magnet 27 may be expressed mathematically. For example, at an observation point 2000, the magnetic field vector $\vec{B}(\vec{r})$ may be expressed as:

$$\vec{B}(\vec{r}) = 3\frac{(\vec{m}\cdot\vec{r})\hat{r}}{r^5} - \frac{\vec{m}}{r^3} \quad (1)$$

where r denotes a distance from the center of the magnet 27 to the observation point 2000 along the radial direction $\hat{r}$. The radial direction $\hat{r}$ and the direction $\hat{m}$ define an angle $\theta$ between the two. At the observation point 2000, the magnetic field component in the radial direction and the magnetic field component in the azimuth direction may be expressed, respectively, as:

$$B_r = 2\frac{m}{4\pi r^3}\cos\theta \quad (2)$$

$$B_\theta = \frac{m}{4\pi r^3}\sin\theta \quad (3)$$

With reference back to FIG. 1, the magnet 27 is mounted adjacent to the drill bit 25. Further, the magnet 27 is rotatable, and may be rotated over time such that the positions of the N and S poles of the magnet become reversed. In at least some embodiments, the magnet 27 is axially oriented as shown, such that the N-S axis of the magnet is perpendicular to the longitudinal axis of the BHA 24. Alternatively, the magnet 27 may be tilted relative to the longitudinal axis of the BHA 24. If multiple magnets are used, their position and/or orientation may vary. If the magnet 27 includes an electromagnet, the magnet 27 may be powered by a local power source such as a battery or fuel cells. Alternatively, power may be delivered from earth's surface via an electrical transmission line.

While not required for the ranging operations described herein, the logging tool 26 may also include one or more EM field sensor units (not shown) to collect EM survey data in response to magnetic fields produced by the magnet 27 and/or ambient EM fields. The telemetry/control unit 28 includes electronics for data storage, communication, etc. Thus, the EM survey data collected by the logging tool 26 may be conveyed to earth's surface and/or is stored by the logging tool 26. In either case, the EM survey data can be analyzed as a function of position and/or time to determine properties of the formations 21. For example, the EM survey data may be used to derive a saturation log as a function of position, to track movement of downhole fluids, and/or monitor other formation properties. The logs and/or formation properties derived from EM survey data may be displayed to an operator via computer 40.

In FIG. 1, an interface 14 at earth's surface for borehole 22A receives EM survey data or other survey data from the BHA 24 via known telemetry techniques such as mud pulse telemetry, acoustic telemetry, EM telemetry, or a wired connection. In some embodiments, the surface interface 14 and/or a computer system 40 may perform various operations such as converting received signals from one format to another, storing survey data, processing survey data, deriving logs from the survey data, and/or displaying logs or other visualization of survey data. Meanwhile, another interface 16 at earth's surface for borehole 22B receives ranging data from the fiber optic sensors 38 deployed along the fiber optic cable 36. The interface may also include optical interrogation components for collecting ranging data from the fiber optic sensors 38. The surface interface 16 and/or a computer system 40 may perform various operations such as converting received signals from one format to another, storing ranging data, processing ranging data, deriving logs from the ranging data, and/or displaying a representation of the BHA's position or other visualization related to ranging data. While the interfaces 14 and 16 are shown to be separate, it should be appreciated that at least some functions of the interfaces 14 and 16 could be combined. Further, the computer 40 may be used to store, process, and visualize EM survey data as well as ranging data. Alternatively, one or more computers may be employed for EM survey data processing and visualization, while one or more other computers are employed for ranging data processing and visualization.

In at least some embodiments, the computer system 40 includes a processor 42 that performs ranging analysis operations by executing software or instructions obtained from a local or remote non-transitory computer-readable medium 48. The processor 42 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium. The computer system 40 also may include input device(s) 46 (e.g., a keyboard, mouse, touchpad, etc.) and output device(s) 44 (e.g., a monitor, printer, etc.). Such input device(s) 46 and/or output device(s) 44 provide a user interface that enables an operator to interact with the logging tool 26 and/or software executed by the processor 42. For example, the computer system 20 may enable an operator to select ranging analysis options, to view collected ranging data, to view ranging analysis results, and/or to perform other tasks.

To perform ranging operations, the magnet 27 may be rotated. For example, the magnet 27 may include stacks of very powerful rare earth magnets that create a time-varying magnetic field when rotating with the drill bit 25. When rotating with the drill bit 25, the magnet 27 produces a rotating, elliptically polarized magnetic field in the earth surrounding the borehole 22A.

During rotation, the magnetic moment of the magnet 27 may rotate at a rate of w radians/second such that the angle defined between the magnetic moment and a reference direction at a time t is given by ωt. At a particular reference point (e.g., reference point 2000 of FIG. 2), the angle between the direction m̂ and the direction of the line from the source to the observation point (e.g., radial direction r̂) may be expressed as $\hat{\theta}_t = \hat{\theta}_0 - \omega t$ where $\hat{\theta}_0$ is the angle between m̂ and the radial direction r̂ at an initial time $t_0$.

Fiber optic sensors 38 on a second borehole of a target well (e.g., borehole 22B) may be considered as being located at different observation points with respect to the magnet 27. Accordingly, the fiber optic sensors 38 measure the magnetic field produced by the magnet 27 at different locations. Further, when the magnet 27 is rotated, the fiber optic sensors 38 may measure the time-varying magnetic field produced by the magnet 27 at different locations and/or at different times. The combination of the results at these different points (and/or different times) provides information about the distance and direction between the magnet 27 (e.g., in the new well being drilled) and one or more of the fiber optic sensors 38 (e.g., in the target well).

To perform ranging operations, the magnet 27 produces a magnetic field 35 while being rotated. The magnetic field 35 is sensed by one or more fiber optic sensors 38 that are part of an array 37 of such sensors 38 deployed in a borehole 22B nearby borehole 22A. While not shown, it should be appreciated that the borehole 22B may correspond to a completed well with casing that has been cemented in place. In such case, the fiber optic sensors 38 may be deployed during the well completion process. For example, each fiber optic sensor 38 may be attached to the exterior of a casing segment by one or more bands or other attachment mechanism. Once the casing is cemented in place, the fiber optic sensors 38 and the fiber optic cable 36 will likewise be cemented in place and will enable ongoing sensing and ranging operations. In alternative embodiments, the borehole 22B may correspond to an open well or partially completed well. In such case, the fiber optic sensors 38 may be deployed along an open section in the borehole 22B using wireline and/or pump down operations. Further, in at least some embodiments, the sensitivity of the fiber optic sensors 38 and the EM properties of the borehole fluid and casing may allow for deployment of the fiber optic sensors 38 inside the casing. In such case, wireline and/or pump down operations may enable the fiber optic sensors 38 to be deployed inside a cased section of the borehole 22B.

The EM field measurements collected by one or more sensors 38 in the array 37 are conveyed to earth's surface via the fiber optic cable 36, which includes one or more optical fibers. It should be appreciated that the spacing of sensors 38 along the fiber optic cable 36 may vary. Further, the manner in which each sensor 38 is coupled to an optical fiber of the fiber optic cable 36 may vary. The availability of multiple optical fibers, optical couplers, and/or reflective components support various options for coupling each fiber optic sensor 38 to the fiber optic cable 36. In operation, the fiber optic sensors 38 generate light in response to an EM field or modulate the intensity or phase of interrogation (source) light in response to an EM field. The generated or modulated light from a given fiber optic sensor 38 provides information regarding the intensity and directional components of the EM field sensed by that given sensor 38. As desired, time division multiplexing (TDM), wavelength division multiplexing (WDM), mode-division multiplexing (MDM) and/or other multiplexing options may be used to recover the measurements associated with each fiber optic sensor 38 deployed along fiber optic cable 36.

Analysis of the EM data measured by one or more of the sensors 38 provides distance and/or direction between the magnet 27 and the one or more of the fiber optic sensors 38.

Further, information regarding the distance and/or direction between a target well and a new well may be derived. In particular, the distance and direction between a drill bit in the new well and one or more points along a target well is of interest. For example, with reference back to FIG. 1, such analysis may provide the length $x_0$ of a horizontal distance between the magnet 27 and one of the sensors 38. Along this dimension, the magnet 27 may be considered to be located at the origin (e.g., x=0).

In some embodiments, an inversion algorithm based on the laws governing EM fields can be used to determine the position of the EM transmitter from the array of EM sensors. For example, in at least some embodiments, processor 42 of computer 40 determines the position of the magnet 27 relative to one or more of the fiber optic sensors 38 by performing an inversion algorithm based on rules or laws governing EM fields. The inversion algorithm may be based on deterministic and/or stochastic methods of optimization.

Figure 3:
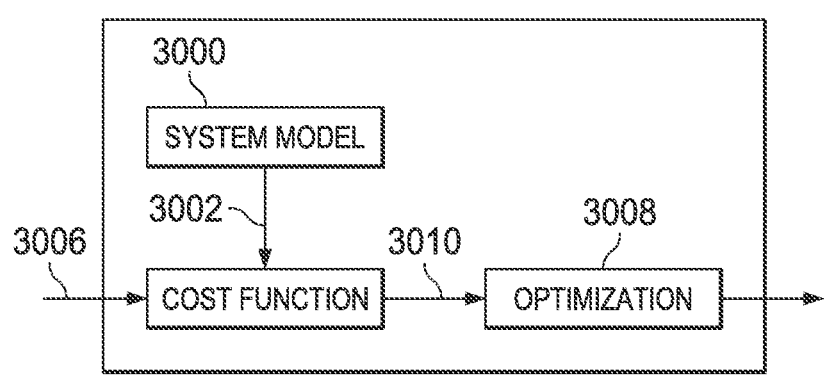
FIG. 3 is a block diagram of an illustrative inversion algorithm.

FIG. 3 is a block diagram illustrating an example of an inversion algorithm. A system model block 3000 provides model information 3002 to cost function block 3004. The model information 3002 may include information regarding a magnetic field (produced by the magnet 27) as observed at various distances (e.g., horizontal distances) and various directions (e.g., angles defined between the magnetic moment of the magnet 27 and radial directions of observation points) with respect to the magnet 27. For example, the model information 3002 may include information regarding the magnetic field as would be sensed by one or more sensors positioned at respective observation points (see, e.g., FIG. 1). Such information may be organized in the form of a matrix.

During drilling in the borehole 22, the magnet 27 may rotate with the drill bit 25 and produce a time-varying magnetic field. The magnetic field may be measured by one or more of the fiber optic sensors 38. The sensors 38 provide measured data 3006 to a processing system that performs operations corresponding to the cost function block 3004. The measured data 3006 may include measurements of the magnetic field as sensed by each of the one or more sensors 38.

As described earlier, a target well may be completed with an array of fiber optic EM sensors permanently deployed behind casing. In this regard, the casing of the target well may be magnetized such that the casing produces a magnetic field about the target well. This magnetic field may change when the magnet 27 is rotating in the vicinity of the target well, and the fiber optic sensors will sense these changes. The model information 3002 may account for the magnetic field (e.g., changes in the magnetic field) that is produced by the casing.

The cost function 3004 and an optimization block 3008 determine a distance and direction of the magnet 27 based on the model information 3002 and the measured data 3006. For example, the cost function block 3004 may perform calculations that compare the measured data 3006 against the model information 3002. These calculations may include a square of a difference between a data point of the model information 3002 and a corresponding data point of the measured data 3006—e.g., (model information−measured data)$^2$. The cost function block 3004 outputs results 3010 to the optimization block 3008. The optimization block 3008 may perform an optimization technique on the results 3010 to output the distance (e.g., horizontal distance) and direction (e.g., angle θ of FIG. 2) between the magnet 27 and the target well.

The ranging analysis results obtained by computer 40 or another processing system provide information regarding the distance and/or direction of the magnet 27 relative to one or more of the fiber optic sensors 38. Using predetermined position information or sensor-based position information for the fiber optic sensors 38, the distance and/or direction information can be used to derive a position of the BHA 24. The derived position of the BHA 24 can be used to confirm that the trajectory for the borehole 22A is acceptable and/or to update the trajectory for the borehole 22A. If trajectory updates are needed, a directional drilling controller (e.g., the computer 40, processor 42, or another controller) is able to direct steering components of the BHA 24. Example steering mechanisms include steering vanes, a "bent sub," and a rotary steerable system.

Figure 4A:
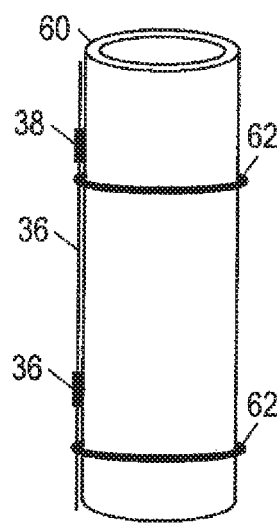
FIGS. 4A-4E are schematic diagrams showing illustrative fiber optic sensor deployment options.
Figure 4B:
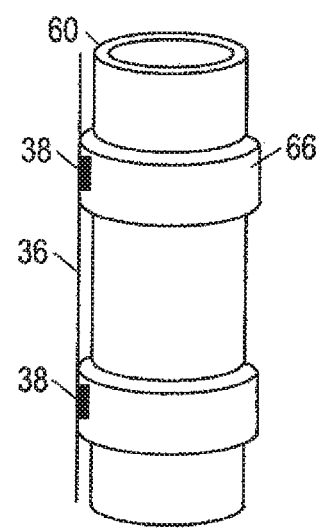
Figure 4C:
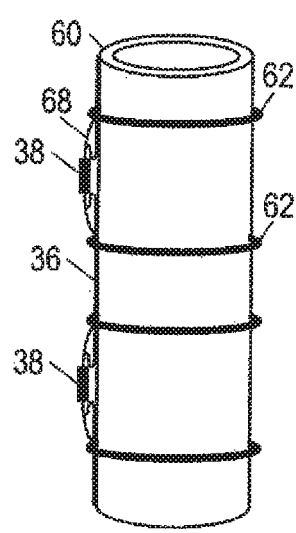

FIGS. 4A-4E show illustrative fiber optic sensor deployment options. For the deployment options represented in FIGS. 4A-4E, the fiber optic sensors 38 are spaced along the fiber optic cable 36 exterior to casing 60. In FIG. 4A, spaced bands 62 are placed around the casing 60 to hold the fiber optic sensors 38 and fiber optic cable 36 in place. In FIG. 4B, the fiber optic sensors 38 are mounted on swellable packers 66. Such packers expand when exposed to downhole conditions, pressing the sensors 38 into contact with the borehole wall. Additionally or alternatively, fins or spacers may be used to space fiber optic sensors 38 away from the casing 60. In FIG. 4C, bow-spring centralizers 68 are used to press the sensors 38 into contact with the borehole walls. To minimize insertion difficulties, a restraining mechanism may hold the spring arms of the bow-spring centralizers 68 against the casing 60 until the casing 60 has been inserted in a corresponding borehole. Thereafter, exposure to downhole conditions or a circulated fluid (e.g., an acid) degrades the restraining mechanism and enables the spring arms of each bow-spring centralizers 68 to extend the sensors 38 against a borehole wall. While only one fiber optic cable 36 is shown in FIGS. 4A-4C, it should be appreciated that multiple fiber optic cables 36 and corresponding sensors could be deployed along casing 60. The use of multiple fiber optic cables 36 and corresponding sensors along casing is one way to increase directional sensitivity for ranging and/or other sensing operations.

Figure 4D:
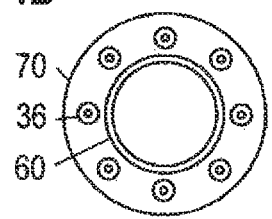
Figure 4E:
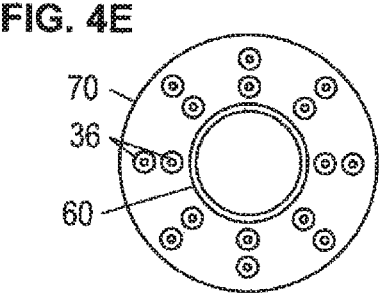

Other extension mechanisms are known in the oilfield and may be suitable for placing the sensors 38 in contact with the borehole wall or into some other desired arrangements such as those illustrated in FIGS. 4D and 4E. In FIG. 4D, multiple fiber optic cables 36 with sensors 38 (not shown) are distributed in the annular space between the casing 60 and a borehole wall 70. In FIG. 4E, the fiber optic cables 36 and corresponding sensors 38 (not shown) have a distribution with axial, azimuthal, and radial variation. The annular space between the casing 60 and the borehole wall 70 could be filled with cement for a more permanent sensor installation. Balloons, hydraulic arms, and projectiles are other contemplated mechanisms for positioning the sensors 38. Besides ensuring that the fiber optic sensors 38 are exposed to the magnetic field 35 produced by the magnet 27, it should be appreciated that the particular position of the sensors 38 in the downhole environment can be considered in the ranging analysis (to help interpret the measured EM fields). Accordingly, position sensors, predetermined information regarding a borehole trajectory, and/or sensor spacing may be used to estimate a fiber optic sensor's position.

Figure 5:
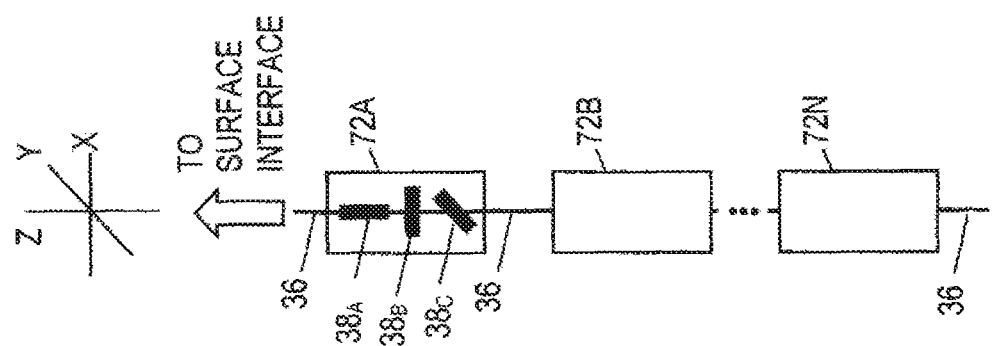
FIG. 5 is a schematic diagram showing an arrangement of fiber optic sensors for ranging.

FIG. 5 shows an illustrative arrangement of EM field sensors. More specifically, each of a plurality of EM field sensor groups 72A-72N couples to fiber optic cable 36 and can collect EM field measurements as described herein. In at least some embodiments, each of the sensor groups 72A-72N may include orthogonal EM field sensors $38_A$, $38_B$, $38_C$ (not shown for groups 72B-72N), where sensor $38_A$ is oriented along the z-axis, sensor $38_B$ is oriented along the x-axis, and sensor $38_C$ is oriented along the y-axis. The generated or modulated light output from each of the EM field sensors $38_A$, $38_B$, $38_C$ is conveyed to a surface interface (e.g., interface 16) via fiber optic cable 36, where its characteristics can be converted to an electrical signal and interpreted to decode information about the EM field sensed by one or more of the sensors $38_A$, $38_B$, $38_C$ in sensor groups 72A-72N. Due to boreholes having trajectories that vary (e.g., vertical and horizontal sections are common), it should be appreciated that the orientation of different sensors $38_A$, $38_B$, $38_C$ for different sensor groups 72-72N may vary depending on where a given sensor group is relative a varying borehole trajectory. In general, the sensors $38_A$, $38_B$, $38_C$ for a given sensor group are orthogonal to each other, but their particular orientation may vary relative to the sensors in other sensor groups. For ranging analysis operations, sensor orientation variance may be accounted for using orientation sensors, predetermined information regarding a borehole's trajectory, and/or a predetermined position of a sensor relative to a casing or borehole.

Figure 6B:
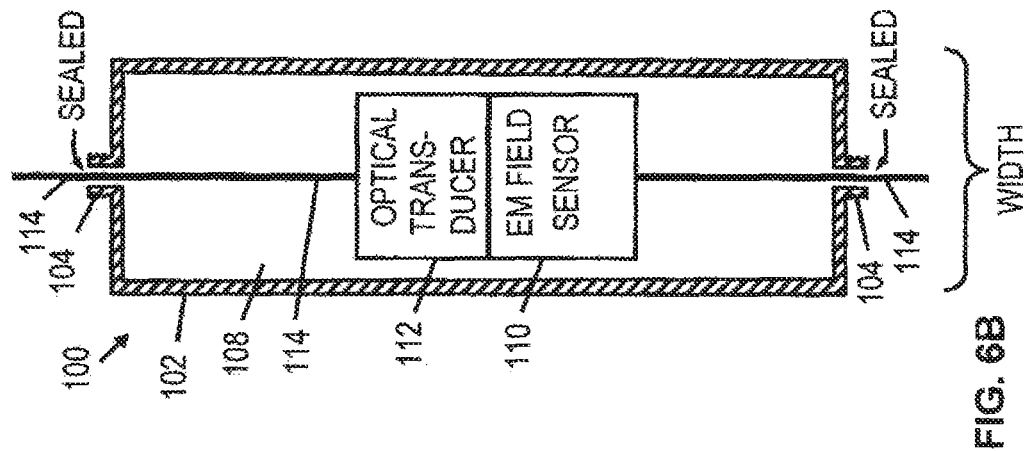
FIG. 6B is a cross-sectional view of the fiber optic sensor unit of FIG. 3A.
Figure 6A:
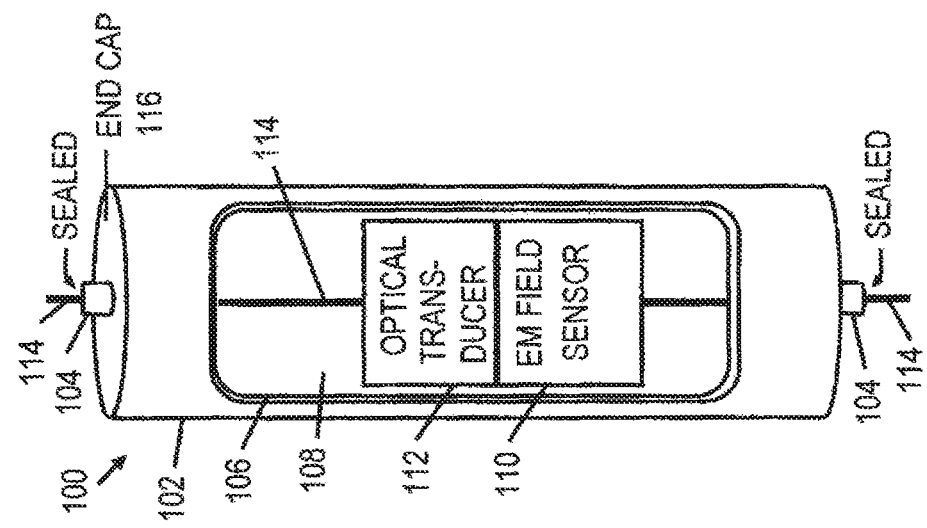
FIG. 6A is a cutaway view of an illustrative fiber optic sensor unit for ranging.

FIG. 6A shows a cutaway view of a fiber optic sensor unit 100. Meanwhile, FIG. 6B shows a cross-sectional view of the field optic sensor unit 100. The fiber optic sensor unit 100 is an example of a fiber optic sensor 38. In both FIGS. 6A and 6B, an optical fiber 114 extends through opposite ends of housing 102. In at least some embodiments, the housing 102 has a hollow cylindrical shape as shown, although other hollow shapes are possible (e.g., rectangular or box shape). Within the housing 102, an EM field sensor 110 and an optical transducer 112 operate to generate a light beam or to modulate a source light beam in presence of an EM field. For example, in one embodiment, the EM field sensor 110 and optical transducer 112 correspond to an electrostrictive or magnetostrictive component bonded to optical fiber 114. In to this configuration, the EM field sensor 110 and optical transducer 112 are combined to form an electro-optical transducer or magneto-optical transducer that directly strains or otherwise changes the condition of the optical fiber 114 in presence of an EM field. For the above examples, the electrostrictive or magnetostrictive component could be considered an EM field sensor 110, while the bond between the electrostrictive or magnetostrictive component and the optical fiber 114 could be considered an optical transducer. As used herein, the term "bonded" refers to any physical or adhesive-based connection such that deformation of the magnetostrictive component causes a corresponding strain to the optical fiber 114. Using an electrostrictive or magnetostrictive component to jacket optical fiber 114 such that the optical fiber 114 is strained in response to deformation of the electrostrictive or magnetostrictive component is an example of a suitable bond.

The above electro-optical transducer and magneto-optical transducer configurations are suitable for optical interrogation, where a source light beam in the optical fiber 114 is modulated by the amount of strain applied to the optical fiber 114 by the electrostrictive or magnetostrictive component in presence of an EM field. Another example of electro-optical transducer and magneto-optical transducer configurations involve wrapping optical fiber 114 around an electrostrictive or magnetostrictive component (e.g., a cylinder) such that a source light beam conveyed along the optical fiber 114 is modulated by the amount of strain applied to the optical fiber 114 by the electrostrictive or magnetostrictive component in presence of an EM field.

In another embodiment, the EM field sensor 110 corresponds to an inductive coil, where a voltage is induced in the coil in presence of a magnetic field. In such case, the optical transducer 112 may correspond to a light-emitting diode (LED) configuration suitable for optical monitoring operations. Alternatively, configurations suitable for optical interrogation operations may employ an optical transducer 112 that modulates a source light beam based on a voltage induced in a coil by a magnetic field. Some example optical transducers 112 suitable for modulating a source light beam based on an induced voltage include: 1) a piezoelectric component bonded to a fiber laser; 2) a hinged reflective surface; 3) a piezoelectric component that bends or strains an optical fiber; 4) an optical resonator; and 5) a lithium niobate modulator. While the above EM field sensor examples are able to detect magnetic field intensity and direction, it should be appreciated that other EM field sensors may be configured to additionally detect electric field intensity and direction.

In at least some embodiments, each fiber optic sensor unit 100 can be configured to measure the triaxial electric and/or magnetic fields. In some embodiments, the magnetic field sensor can consist of an optical fiber bonded to or jacketed by a magnetorestrictive material. Some common magnetostrictive materials include cobalt, nickel, and iron metals, and their alloys, e.g., Metglass and Terfenol-D. When exposed to a time-varying magnetic field, the deformation (i.e., change in shape) in the magnetorestrictive material induces a strain on the optical fiber, which can be remotely interrogated using any of the fiber-optic strain measurement methods including but not limited to inteferometric, fiber Bragg grating (FBG), fiber laser strain (FLS), and extrinsic Fabry-Perot interferometric (EFPI) methods. The strain is proportional to the applied magnetic field. Generally, the sensor is operated such that the strain is linearly proportional to the applied magnetic field.

In recent experiments in which magnetic field sensors were characterized for permanent deployment in waterflood monitoring, the minimum detectable magnetic field required to drive Terfenol-D or Metglas magnetorestriction is approximately 30-40 µA/m. In other embodiments, an electric field sensor may include an optical fiber bonded to or jacketed by an electrorestrictive material. Some common electrorestrictive materials include lithium niobate and lead zirconate titanate (PZT). When the earth's potential sensed between an electrode pair is applied to the electrorestrictive material, the deformation (i.e., change in shape) in the electrorestrictive material induces a strain on the optical fiber, which can be remotely interrograted using any of the fiber-optic strain measurement methods including but not limited to inteferometric, fiber Bragg grating (FBG), fiber laser strain (FLS), and extrinsic Fabry-Perot interferometric (EFPI) methods. The strain is proportional to the applied electric field. Generally, the sensor is operated such that the strain is linearly proportional to the earth's potential field. In recent experiments in which electric field sensors where characterized for permanent deployment in waterflood monitoring, the minimum detectable potential difference required between an electrode pair to drive PZT electrorestriction is approximately 1 µV.

In different embodiments, each fiber optic sensor unit 100 may include one EM field sensor 110 as shown or may include multiple EM field sensors 110. In other words, each fiber optic sensor unit 100 can be constructed to measure one, two, or three directional components of an EM field. In addition to having one or more EM field sensors 110, each fiber optic sensor unit 100 may include one or more optical transducers 112 placed within a single sensor unit housing. In such case, the component orientation (e.g., orthogonal, collinear) and/or position (e.g., staggered) may vary to derive more diverse spatial information about the EM field, i.e., multicomponent measurements of the EM field.

When assembling a fiber optic sensor unit 100, the housing 102 may have at least two parts. For example, one of the ends of the housing 102 may initially be open to allow the EM field sensor 110, the optical transducer 112, and the optical fiber 114 to be positioned inside the housing 102. Once the EM field sensor 110, the optical transducer 112, and the optical fiber 14 are positioned as desired, an end cap 116 with a hole for the optical fiber 114 and/or connecter 104 is added to cover the open end of the housing 102. The end cap 116 may be coupled to the rest of the housing 102 using welds, threads, adhesive, etc.

In at least some embodiments, the housing 102 provides space 108 around the EM field sensor 110 and/or optical transducer 112 so that the EM field sensor 110 and/or optical transducer 112 are free to deform in presence of an EM field. Without limitation to other embodiments, an example fiber optic sensor unit 100 has a maximum width of about 1 inch (2.5 cm), a housing thickness of about 0.08 inches (2 mm), and a maximum length of about 4 inches (10 cm). A plurality of such fiber optic sensor units 100 may be added (e.g., via splicing) to a tubing encapsulated cable (TEC), which typically have an outer diameter of approximately 0.39 inches (1 cm). When assembly is complete, a modified TEC with distributed fiber optic sensor units 100 may be deployed downhole in a ranging environment as described herein.

In at least some embodiments, the housing 102 includes connectors 104 at opposite ends where the optical fiber 114 extends through the housing 102. For example, the connectors 104 may be part of the housing and/or end caps 116. Alternatively, the connectors 104 may be added to end cap 116 using welds, threads, adhesive, sealants, etc. The connectors 104 enable a fiber optic sensor unit 100 to couple to a cable (e.g., cable 36). As an example, the connector 104 may be threaded or otherwise configured to mate with a corresponding connector of a cable. In addition, the optical fiber 114 extending from the housing 102 at opposite ends may be spliced with optical fibers of a cable to form a continuous optical waveguide. Available splicing techniques may be employed to create a fiber optic cable (e.g., cable 36) with a plurality of such sensor units 100 distributed along the length of the cable.

In at least some embodiments, the fiber optic sensor units 100 can be fabricated in such a manner to enable efficient mass production and ease of deployment as part of a permanent EM monitoring system. For example, sensor units 100 and a corresponding cable (e.g., cable 36) can be pre-fabricated in a factory and delivered on a cable reel for ease of deployment at the well site during the completion of a well. A ranging analysis system employing sensor units 100 can be simultaneously deployed with other fiber optic-based sensors including, but not limited to, acoustic sensors, temperature sensors, pressure sensors, strain sensors, chemical sensors, current sensors and/or electric field sensors.

Figure 7:
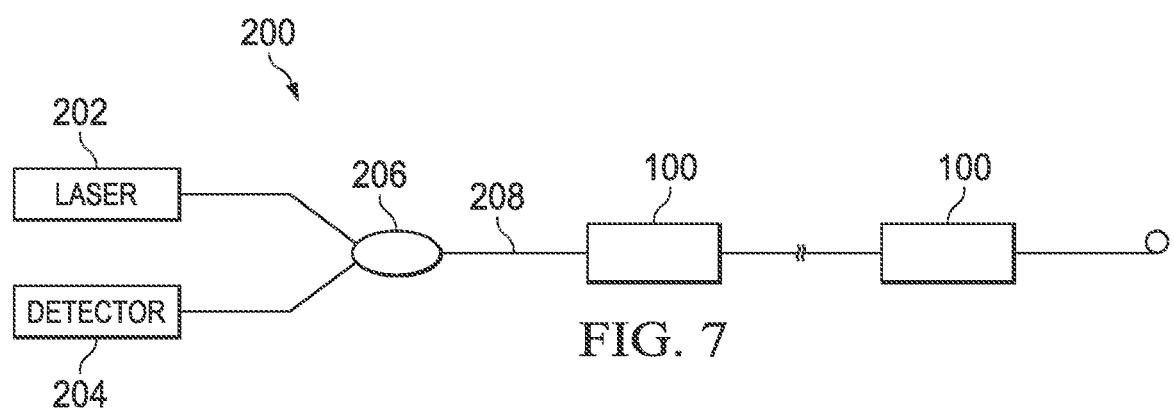
FIG. 7 is a schematic diagram showing an illustrative optical interrogation system.

In accordance with at least some embodiments, a plurality of fiber optic sensor units 100 can be deployed along the same optical fiber and interrogated or monitored through at least one method of multiplexing. FIG. 7 shows an illustrative optical interrogation system 200. In system 200, various fiber optic sensor units 100 are distributed along optical fiber(s) 208 or a corresponding cable (e.g., cable 36). The optical fiber(s) 208 is coupled to a laser 202 and a in detector 204 via a coupler 206. In at least some embodiments, the laser 202 and the detector 204 are part of an interrogation interface (e.g., interface 16 of FIG. 1). In operation, one or more of the fiber optic sensor units 100 modulate source light beams emitted by the laser 202 in accordance with an EM field present at the location of each of the sensor units 100.

The detector 204 receives the modulated source light beams and recovers EM field measurements. The laser 202, the detector 204, the fiber optic sensor units 100, and/or the optical fiber(s) 208 may be configured for multiplexing options such as TDM, WDM, and/or MDM. In principle, the number of fiber optic sensor units 100 in system 200 is only limited by the attenuation of light propagating along the optical fiber(s) 208. Certain contemplated embodiments include hundreds of fiber optic sensor units 100 along a given optical fiber 208.

Figure 8:
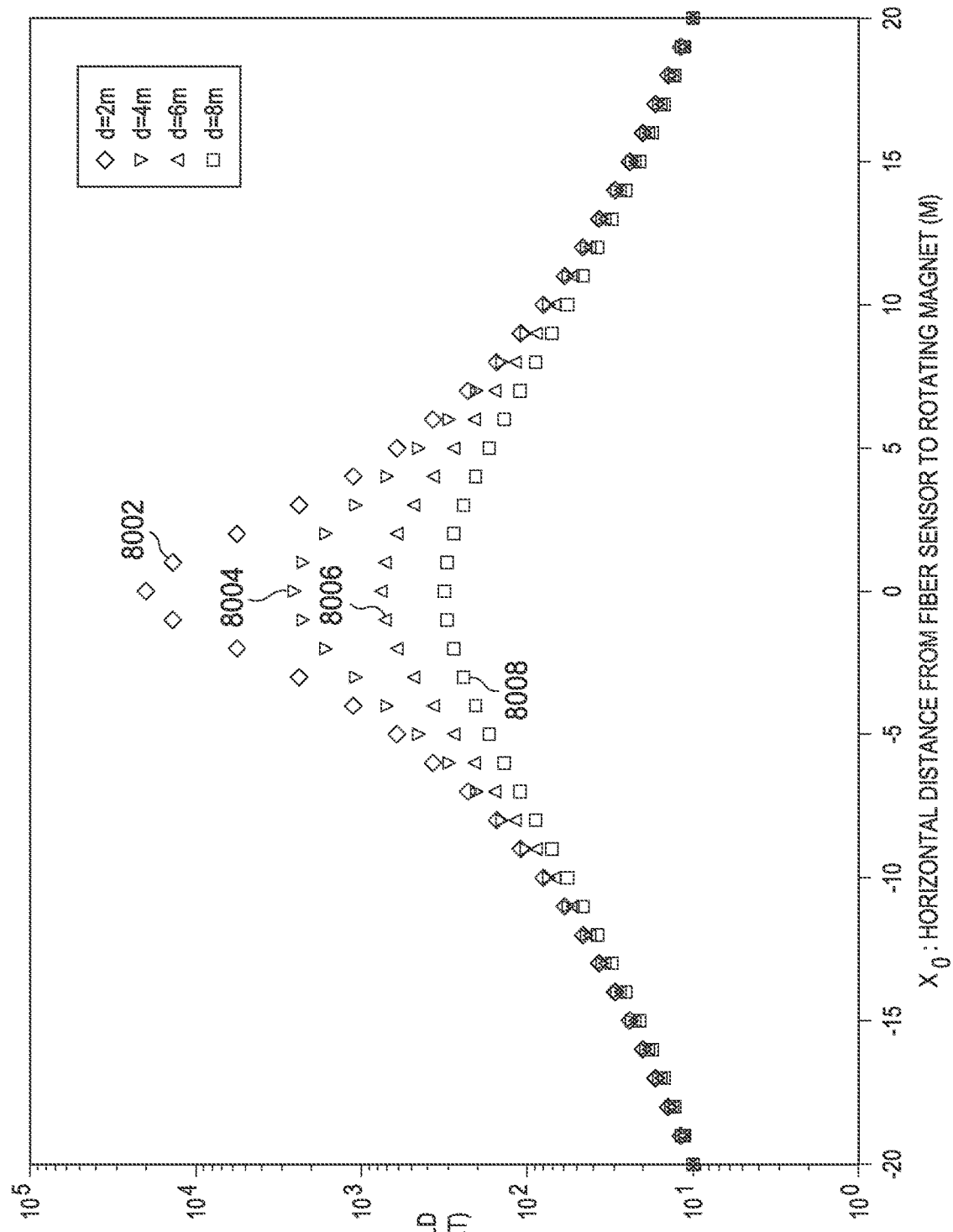
FIG. 8 is a graph showing illustrative magnetic field measurement characteristics.

FIG. 8 is a graph showing illustrative magnetic field measurement characteristics. Such data characteristics may be included in the model information provided by system model 3000 of FIG. 3. The graph includes curve plots 8002, 8004, 8006 and 8008, which correspond, to separations (or spacings) of 2 m, 4 m, 6 m and 8 m, respectively, between a well and a target well. Each of the plots shows relationships between the horizontal distance (between a magnet and an observation point) and the amplitude of the magnetic field as sensed by a fiber optic sensor at the observation point. It is assumed that the magnet has a strength of m=1 Weber meters. As illustrated in FIG. 8, the shape of each of the plots 8002, 8004, 8006 and 8008 becomes sharper and more pronounced (similar to the center of a bell-shaped curve) as the magnitude of the horizontal distance decreases towards zero. In scenarios where multiple fiber optic sensors are deployed as described herein, the maximum amplitude and/or the slope related to measurements obtained from multiple fiber optic sensors can be used to identify the position of the fiber optic sensors relative to a rotating magnet.

Figure 9:
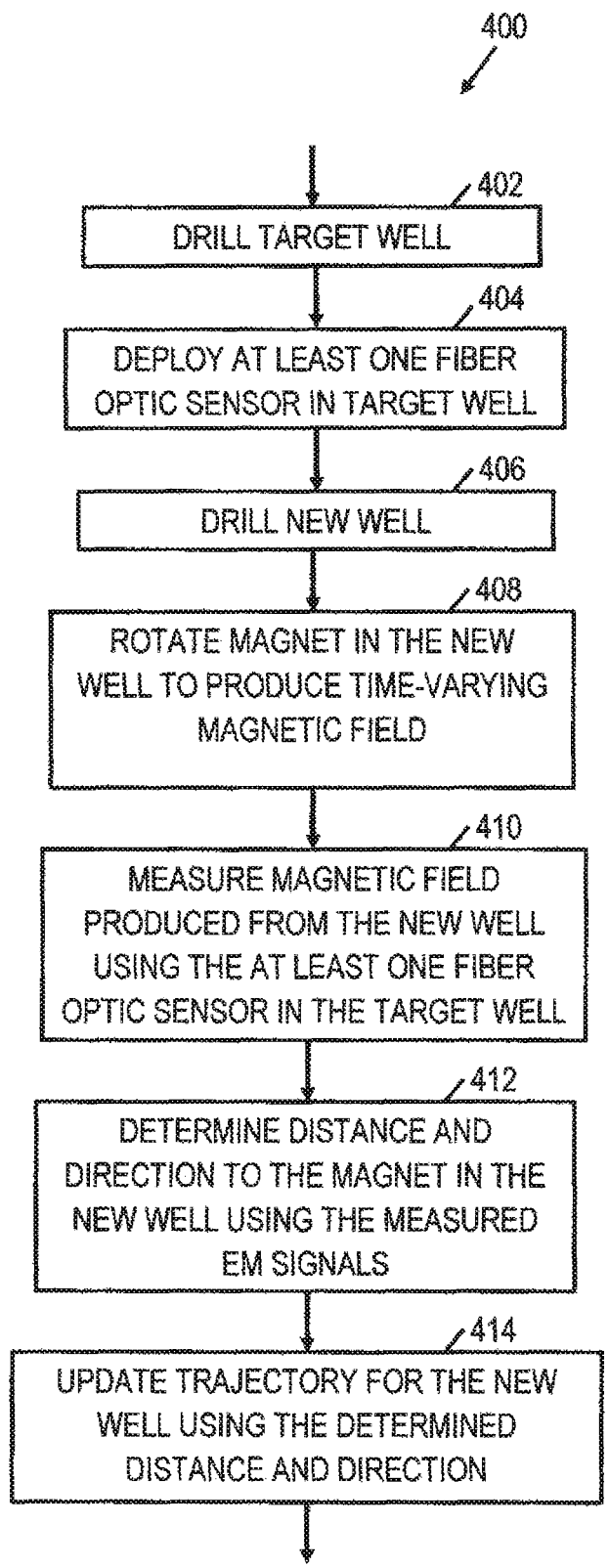
FIG. 9 is a flowchart showing an illustrative ranging method employing a rotating magnet and fiber optic sensors.

FIG. 9 is a flowchart showing an illustrative ranging method 400 employing a rotating magnet and fiber optic sensors. In the method 400, a first well (e.g., the target well) is drilled at block 402. At block 404, at least one fiber optic sensor is deployed in the target well. Various sensor deployment options are possible as described herein. At block 406, a second well (e.g., the new well) is drilled. At block 408, a time-varying magnetic field is produced by a magnet that is rotated in the new well. At block 410, the magnetic field produced from the new well is measured using the at least one fiber optic sensor in the target well. At block 412, the distance and direction to the magnet in the new well relative to the at least one fiber optic sensor are determined using the measured magnetic field. At block 414, the trajectory for the new well is updated using the determined distance and direction. In blocks 412 and 414, magnetic measurements collected by the at least one fiber optic sensor in the target well are used to perform ranging operations that identify the position of the magnet or a related BHA in the new well. The position of the BHA can be compared to a desired trajectory or position, and steering updates can be performed accordingly. If the position or trajectory is determined to be within a threshold tolerance, no steering updates are needed and drilling continues as planned. At least blocks 408, 410, 412, and 414 in method 400 can be performed multiple times while drilling the new well to guide the trajectory of the new well relative to a measured or predetermined position of the fiber optic sensors in the target well.

In at least some embodiments, the ranging method 400 may be performed using components that have a dual role. For example, the fiber optic cable coupled to the fiber optic sensors may be used to convey EM field measurements used for ranging analysis as described herein as well as for collecting distributed sensing parameters such as temperature, pressure, acoustic activity, or other downhole parameters. Further, the fiber optics sensors could be used to perform the ranging operations as described herein as well as to collect EM survey data (e.g., during production and reservoir monitoring operations). By using components with a dual role, the overall cost of data collection operations is reduced compared to using separate systems.

According to embodiments described earlier, a magnet is located adjacent to a drill bit (see, e.g., magnet 27 and drill bit 25 of FIG. 1). Alternatively (or in addition), the drill bit may also have magnetic properties. Accordingly, when the drill bit rotates while drilling, the drill bit may produce a time-varying magnetic field that may be sensed by fiber optic sensors (e.g., fiber optic sensors 38 of FIG. 1). Therefore, ranging may be performed by measuring the magnetic field produced by a magnetic drill bit instead of the magnetic field produced by a separate magnet (e.g., magnet 27). Alternatively, ranging may be performed by measuring the magnetic field produced by the magnetic drill bit in addition to the magnetic field produced by a separate magnet.

According to embodiments disclosed earlier, ranging is performed with respect to a target well having a portion that longitudinally extends parallel to a longitudinal axis of a BHA (see, e.g., FIG. 1). It is understood that features of these embodiments may also employed for T-intersection ranging.

Figure 10:
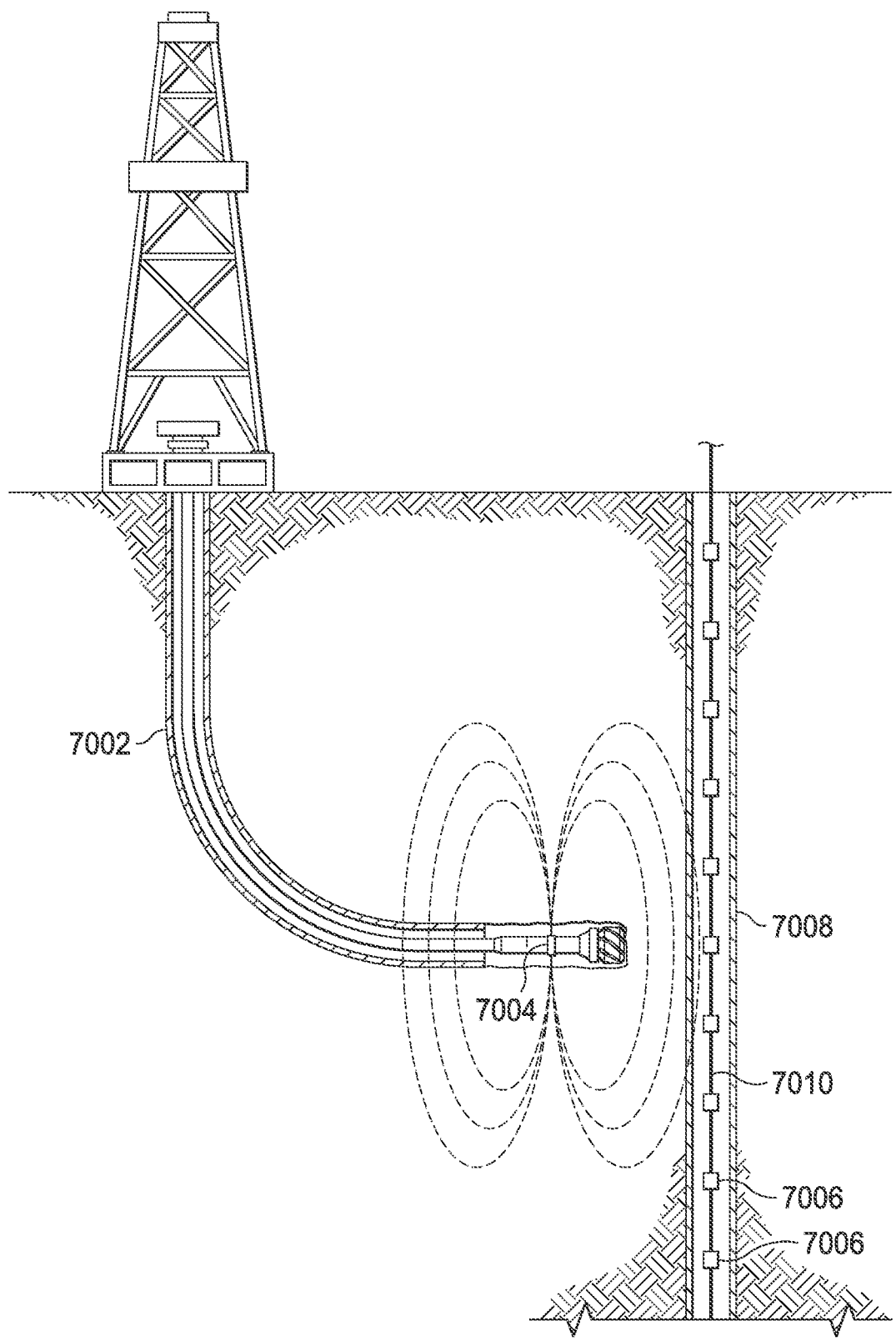
FIG. 10 shows an illustrative T-intersection ranging scenario

FIG. 10 shows an illustrative T-intersection ranging scenario. A BHA 7000 with a drill bit is located in borehole 7002. The BHA 7000 includes a logging tool with at least one magnet 7004. The magnet 7004 produces a magnetic field while being rotated. The magnetic field is sensed by one or more fiber optic sensors that are part of an array of such sensors 7006 coupled to a fiber optic cable 7010 in a borehole 7008. As illustrated in FIG. 10, the longitudinal axis of the BHA 7000 is generally perpendicular to that of the borehole 7008. To improve the detection range for a T-intersection ranging scenario, the magnet 7004 can be placed close to or at the drill bit. Further, using multiple rare earth magnets (e.g., one or more stacks) as the magnet 7004 would extend the detection range. While the magnet 7004 is shown to have a north-south axis perpendicular to the axis of drillstring rotation, it should be appreciated that the axis of the magnet 7004 could be at a tilt (a non-perpendicular angle) relative to the axis of drillstring rotation. For a T-intersection ranging scenario, analysis of measurements obtained by the fiber optic sensors 7006 may involve determining the length $y_0$ of a vertical distance between the magnet 7004 and one of more of the sensors 7006. Along this dimension, the magnet 7004 may be considered to be located at the origin (e.g., y=0). Further, the direction between one or more one of more of the sensors 7006 and the magnet 7004 (e.g., angles defined between the magnetic moment of the magnet 7004 and radial directions of observation points corresponding to each sensor 7006) can be identified.

Figure 11:
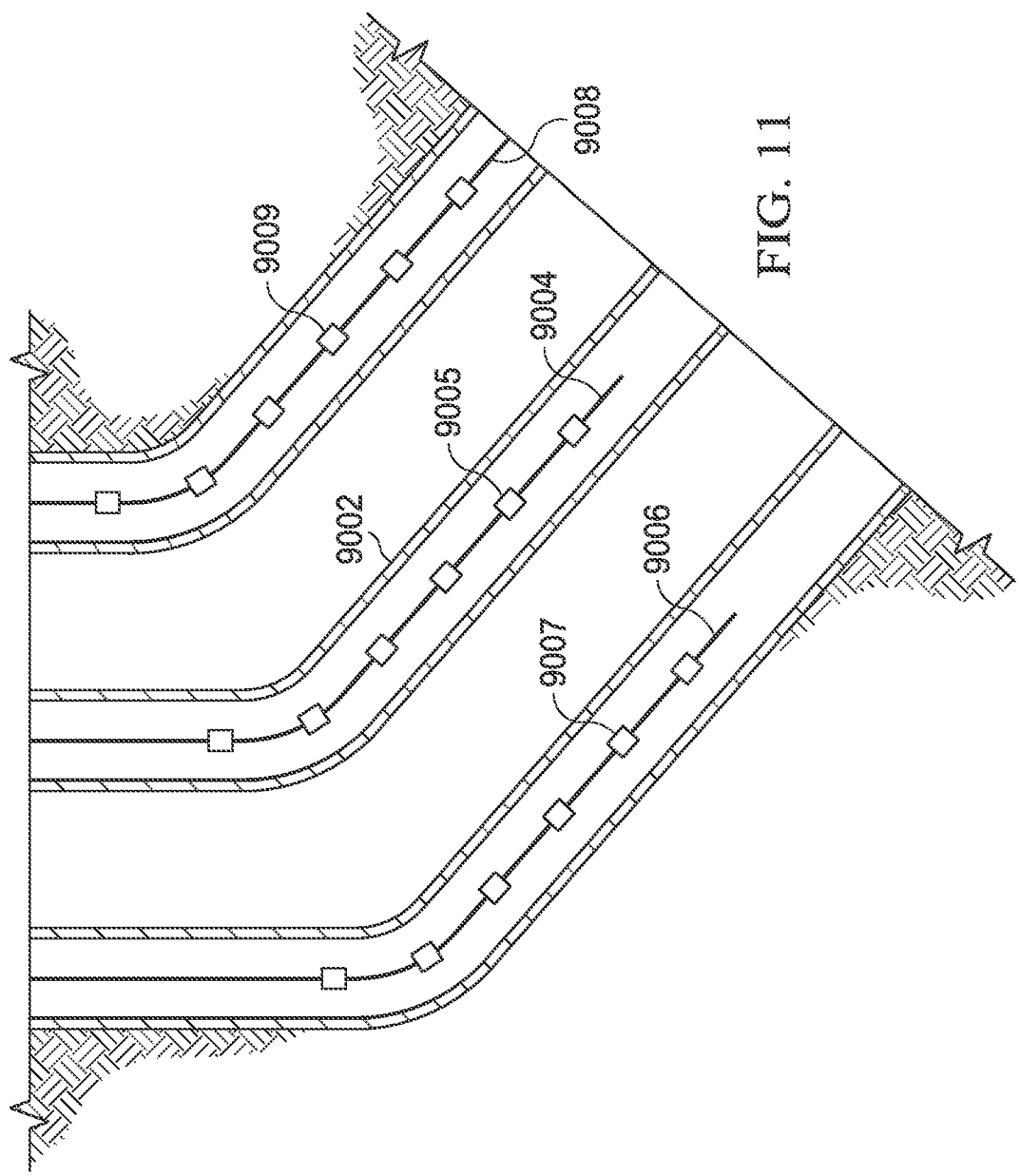
FIG. 11 shows an illustrative ranging scenario.

According to embodiments disclosed earlier, ranging is performed with respect to one target well. It is understood that features of these embodiments may also employed for ranging to two or more target wells concurrently. FIG. 11 shows an illustrative ranging scenario, where a plurality of target wells with fiber optic sensors are available for ranging operations when drilling a new well. A drillstring is employed in a borehole 9002. Fiber optic sensors 9005 are deployed in a borehole 9004. As disclosed earlier, measurements provided by the fiber optic sensors 9005 may be used to perform ranging, to position the borehole 9002 relative to the borehole 9004.

In addition, ranging with respect to one or more additional target wells may be performed concurrently. For example, fiber optic sensors 9007 and 9009 are deployed, respectively, in boreholes 9006 and 9008. Accordingly, measurements provided by the fiber optic sensors 9007 may be used to perform ranging, to position the borehole 9002 relative to the borehole 9006. Alternatively (or in addition), measurements provided by the fiber optic sensors 9009 may be used to perform ranging, to position the borehole 9002 relative to the borehole 9008. As a result, a desired spacing between borehole 9002 and borehole 9004, and a desired spacing between borehole 9002 and at least one other borehole (e.g., borehole 9006, 9008) may be achieved.

Embodiments disclosed herein include:

A: A system includes a drillstring in a first borehole. The drillstring includes a magnet rotatable about an axis of the drillstring. The system further includes at least one fiber optic sensor deployed in a second borehole for generating electromagnetic (EM) field measurements in response to a magnetic field produced by rotation of the magnet about the axis of the drillstring. The system further includes a processor in electronic communication with the at least one fiber optic sensor to determine a distance or direction of the magnet relative to the at least one fiber optic sensor based on the EM field measurements.

B. A method that includes producing a magnetic field by rotating a magnet in a first borehole. The method also includes obtaining EM field measurements generated in response to the magnetic field using at least one fiber optic sensor deployed in a second borehole. The method also includes determining a distance or direction of the magnet relative to one or more of the at least one fiber optic sensor based on the EM field measurements.

Each of the embodiments, A and B, may have one or more of the following additional elements in any combination. Element 1: wherein the magnet comprises a drill bit that is magnetic. Element 2: wherein the magnet comprises a permanent magnet. Element 3: wherein a magnetic moment of the permanent magnet is perpendicular or tilted with respect to a rotational axis of a bottomhole assembly (BHA) located at an end of the drillstring. Element 4: wherein the processor is further configured to determine the distance or direction of the magnet as a function of the EM field measurements and model data. Element 5: wherein the processor updates a trajectory for the first borehole in response to the determined distance or direction. Element 6: wherein the at least one fiber optic sensor is deployed along a fiber optic cable that extends along a casing exterior in the second borehole. Element 7: wherein the at least one fiber optic sensor is deployed along a fiber optic cable used for sensing of temperature, pressure, chemicals, or acoustic activity at two or more locations. Element 8: wherein the at least one fiber optic sensor resides within a protective housing. Element 9: wherein the at least one fiber optic sensor comprises a magnetic field sensor. Element 10: wherein the at least one fiber optic sensor comprises a magneto-optical transducer. Element 11: wherein the magnet is part of a logging-while-drilling (LWD) tool that collects EM survey data separate from the EM field measurements used for ranging operations.

Element 12: wherein the magnetic field is produced by rotating a drill bit that is magnetic in the first borehole. Element 13: wherein the magnetic field is produced by rotating a permanent magnet in the first borehole. Element 14: further comprising updating a drilling trajectory for the first borehole in response to the determined distance or direction. Element 15: further comprising deploying the at least one fiber optic sensor along a fiber optic cable that extends along a casing exterior in the second borehole. Element 16: further comprising deploying the at least one fiber optic sensor along a fiber optic cable used for sensing of temperature, pressure, chemicals, or acoustic activity at two or more locations. Element 17: wherein obtaining EM field measurements generated in response to the magnetic field using the at least one fiber optic sensor comprises obtaining tri-axial EM field measurements. Element 18: wherein one or more of the at least one fiber optic sensor obtains an EM field measurement by: outputting a voltage in response to the magnetic field; and emitting a light based on the voltage or modulating an interrogation light based on the voltage.

Numerous variations and modifications will become apparent to those skilled in the art once the above disclosure is fully appreciated. The methods and systems can be used for directional drilling and/or for other operations that rely on tracking position of a downhole object relative to a reference position or target position. The ensuing claims are intended to cover such variations where applicable.

What is claimed is:

1. A system comprising:
    a drillstring in a first borehole, the drillstring comprising a magnet rotatable about an axis of the drillstring;
    at least one fiber optic sensor deployed in a second borehole for generating electromagnetic (EM) field measurements in response to a magnetic field produced by rotation of the magnet about the axis of the drillstring; and
    a processor in electronic communication with the at least one fiber optic sensor to determine a distance or direction of the magnet relative to the at least one fiber optic sensor based on the EM field measurements.

2. The system of claim 1, wherein the magnet comprises a drill bit that is magnetic.

3. The system of claim 1, wherein the magnet comprises a permanent magnet.

4. The system of claim 3, wherein a magnetic moment of the permanent magnet is perpendicular or tilted with respect to a rotational axis of a bottomhole assembly (BHA) located at an end of the drillstring.

5. The system of claim 1, wherein the processor is further configured to determine the distance or direction of the magnet as a function of the EM field measurements and model data.

6. The system of claim 1, wherein the processor updates a trajectory for the first borehole in response to the determined distance or direction.

7. The system of claim 1, wherein the at least one fiber optic sensor is deployed along a fiber optic cable that extends along a casing exterior in the second borehole.

8. The system of claim 1, wherein the at least one fiber optic sensor is deployed along a fiber optic cable used for sensing of temperature, pressure, chemicals, or acoustic activity at two or more locations.

9. The system of claim 1, wherein the at least one fiber optic sensor resides within a protective housing.

10. The system of claim 1, wherein the at least one fiber optic sensor comprises a magnetic field sensor.

11. The system of claim 1, wherein the at least one fiber optic sensor comprises a magneto-optical transducer.

12. The system according to claim 1, wherein the magnet is part of a logging-while-drilling (LWD) tool that collects EM survey data separate from the EM field measurements.

13. A method comprising:
producing a magnetic field by rotating a magnet in a first borehole;
obtaining electromagnetic (EM) field measurements generated in response to the magnetic field using at least one fiber optic sensor deployed in a second borehole; and
determining a distance or direction of the magnet relative to one or more of the at least one fiber optic sensor based on the EM field measurements.

14. The method of claim 13, wherein the magnetic field is produced by rotating a drill bit that is magnetic in the first borehole.

15. The method of claim 13, wherein the magnetic field is produced by rotating a permanent magnet in the first borehole.

16. The method of claim 13, further comprising updating a drilling trajectory for the first borehole in response to the determined distance or direction.

17. The method of claim 13, further comprising deploying the at least one fiber optic sensor along a fiber optic cable that extends along a casing exterior in the second borehole.

18. The method of claim 13, further comprising deploying the at least one fiber optic sensor along a fiber optic cable used for sensing of temperature, pressure, chemicals, or acoustic activity at two or more locations.

19. The method of claim 13, wherein obtaining EM field measurements generated in response to the magnetic field using the at least one fiber optic sensor comprises obtaining tri-axial EM field measurements.

20. The method of claim 13, wherein one or more of the at least one fiber optic sensor obtains an EM field measurement by:
outputting a voltage in response to the magnetic field; and
emitting a light based on the voltage or modulating an interrogation light based on the voltage.

* * * * *

UNITED STATES PATENT AND TRADEMARK OFFICE
CERTIFICATE OF CORRECTION

PATENT NO. : 10,920,575 B2  
APPLICATION NO. : 15/755177  
DATED : February 16, 2021  
INVENTOR(S) : Akram Ahmadi Kalateh Ahmad and Burkay Donderici It is certified that error appears in the above-identified patent and that said Letters Patent is hereby corrected as shown below:

In the Specification

Column 9, Lines 27 and 31, for the word -magnetorestrictive-, each occurrence, should read --magnetostrictive--

Column 9, Line 29, the word -Metglass- should read --Metglas--

Column 9, Lines 33 and 52, for the word -interrograted-, each occurrence, should read --interrogated--

Column 9, Lines 34 and 54, for the word -inteferometric-, each occurrence, should read --interferometric--

Column 9, Line 43, the word -magnetorestriction- should read --magnetostriction--

Column 9, Lines 46, 47, 49 and 51, for the word -electrorestrictive-, each occurrence, should read --electrostrictive--

Column 9, Line 59, the word -where- should read --were--

Column 9, beginning in Line 62, the word -electrorestriction- should read --electrostriction--

Signed and Sealed this  
Fourth Day of May, 2021

Drew Hirshfeld  
*Performing the Functions and Duties of the  
Under Secretary of Commerce for Intellectual Property and  
Director of the United States Patent and Trademark Office*